United States Patent
Phan et al.

(10) Patent No.: US 10,749,219 B2
(45) Date of Patent: Aug. 18, 2020

(54) METHOD FOR FORMING A LI-ION BATTERY CELL COMPRISING AN LNMO CATHODE MATERIAL

(71) Applicant: RENAULT s.a.s., Boulogne-Billancourt (FR)

(72) Inventors: Viet-Phong Phan, Grenoble (FR); Lise Daniel, Saint-Marcellin (FR); Gregory Si Larbi, Sillans (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 331 days.

(21) Appl. No.: 15/303,977

(22) PCT Filed: Apr. 14, 2015

(86) PCT No.: PCT/FR2015/051003
§ 371 (c)(1),
(2) Date: Nov. 1, 2016

(87) PCT Pub. No.: WO2015/159019
PCT Pub. Date: Oct. 22, 2015

(65) Prior Publication Data
US 2017/0125854 A1    May 4, 2017

(30) Foreign Application Priority Data
Apr. 17, 2014 (FR) .................... 14 53484

(51) Int. Cl.
*H01M 4/82* (2006.01)
*H01M 10/44* (2006.01)
(Continued)

(52) U.S. Cl.
CPC ......... *H01M 10/446* (2013.01); *H01M 4/505* (2013.01); *H01M 4/525* (2013.01);
(Continued)

(58) Field of Classification Search
CPC ........... H01M 10/446; H01M 10/0525; H01M 10/052; H01M 10/058; H01M 4/505; H01M 4/525; H01M 2220/20
See application file for complete search history.

(56) References Cited

U.S. PATENT DOCUMENTS

| | | | |
|---|---|---|---|
| 2008/0138703 A1 | 6/2008 | Deguchi et al. | |
| 2010/0192362 A1* | 8/2010 | Yoon | H01M 4/139 29/623.2 |
| 2011/0236751 A1* | 9/2011 | Amiruddin | H01M 4/0447 429/188 |

FOREIGN PATENT DOCUMENTS

| | | |
|---|---|---|
| EP | 1 052 714 A1 | 11/2000 |
| JP | 2002-216843 A | 8/2002 |

(Continued)

OTHER PUBLICATIONS

French Search Report dated Dec. 1, 2014 in FR 1453484 filed Apr. 17, 2014.
(Continued)

*Primary Examiner* — Raymond Alejandro
(74) *Attorney, Agent, or Firm* — Oblon, McClelland, Maier & Neustadt, L.L.P.

(57) ABSTRACT

A process forms a Li-ion battery cell including an LNMO-based cathode material, an anode material, a separator and an electrolyte. The process successively includes charging the cell until the cell reaches a state of charge of 100%, storing the cell in the state of charge of 100% in an open circuit for a period of time of at least 48 hours, and removing gas generated during the charging and the storage.

10 Claims, 2 Drawing Sheets

(51) Int. Cl.
     *H01M 4/505*          (2010.01)
     *H01M 10/0525*     (2010.01)
     *H01M 4/525*          (2010.01)
     *H01M 10/058*      (2010.01)

(52) U.S. Cl.
     CPC ..... *H01M 10/058* (2013.01); *H01M 10/0525* (2013.01); *H01M 2220/20* (2013.01)

(56) References Cited

FOREIGN PATENT DOCUMENTS

| | | |
|---|---|---|
| JP | 2002-216851 A | 8/2002 |
| KR | 10-2013-0126365 A | 11/2013 |

OTHER PUBLICATIONS

International Search Report dated Jun. 5, 2015 in PCT/FR2015/051003 filed Apr. 14, 2015.

\* cited by examiner

METHOD FOR FORMING A LI-ION BATTERY CELL COMPRISING AN LNMO CATHODE MATERIAL

CROSS-REFERENCE TO RELATED APPLICATIONS

This application is a National Stage of PCT/FR2015/051003, which was filed on Apr. 14, 2015. This application is based upon and claims the benefit of priority to French Application No. 1453484, which was filed on Apr. 17, 2014.

BACKGROUND

1. Field of the Invention

The invention relates to the general field of rechargeable lithium-ion (Li-ion) batteries.

More specifically, the invention relates to rechargeable Li-ion batteries comprising a cathode material based on "5V" spinel oxide, i.e. on nickel-substituted lithium manganese oxide of formula $LiNi_xMn_{2-x}O_4$ (LNMO), in which $0<x\leq0.5$.

Even more specifically, the invention relates to a process for forming a Li-ion battery cell comprising an LNMO-based cathode material.

Conventionally, Li-ion batteries comprise one or more cathodes, one or more anodes, an electrolyte and a separator composed of a porous polymer or of any other appropriate material in order to prevent any direct contact between the electrodes.

Li-ion batteries are already widely used in many roaming applications. This trend is explained in particular by mass and volume energy densities which are markedly greater than those of conventional nickel-cadmium (Ni—Cd) and nickel-metal hydride (Ni—MH) batteries, an absence of memory effect, low self-discharge in comparison with other batteries and also a fall in the costs at the kilowatt-hour related to this technology.

Nevertheless, an improvement in this technology is required in order to win a share of new markets such as electric and hybrid vehicles which often demand a high energy density, a high power density and a long lifetime.

One possible route for increasing the energy density of the cell is to replace the conventional cathode materials with high voltage materials, for instance spinel oxides of general composition $LiNi_xMn_{2-x}O_4$ (LNMO), in which $0<x\leq0.5$ and the redox potential of which is 4.7 V vs $Li^+/Li$.

However, these materials have drawbacks related to a relatively high self-discharge and strong degassing during use and storage because of the instability of conventional electrolytes during contact with the surface of the LNMO-based material at high voltage. This is because, once the electrolyte has impregnated into the cell, the Li-ion battery cell is activated. Thermodynamic reactions are then established and the first lithium ion exchanges between the electrodes take place. Products resulting from these reactions accumulate on the surface of the electrodes so as to form a layer known as the "Solid Electrolyte Interphase" (SEI). This SEI layer is an element essential to the correct operation of the Li-ion battery since, not only does it conduct lithium ions very well, but it also has the advantage of stopping catalytic decomposition of the solvent. However, an unstable SEI layer leads, among other things, to a strong drop in capacity.

2. Description of Related Art

In order to solve this problem of instability at high voltage, several approaches, aimed at protecting the electrolyte/cathode (LNMO) interface, have been envisioned.

Thus, additives have been introduced into the electrolyte and react at the surface of the LNMO-based cathode material in order to create a protective barrier at the electrolyte/cathode (LNMO) interface, as described by K. Xu et al. in "Electrolyte additive in support of 5V Li ion chemistry" *Journal of The electrochemical Society*, 158, 3, A337-A342 (2011).

A stable coating has been deposited on the surface of the LNMO-based cathode material in order to protect it from the electrolyte, as described by Kim et al. in "A perspective on coatings to stabilize high-voltage cathodes: $LiMn_{1.5}Ni_{0.5}O_4$ with sub-nanometer lipon cycled with $LiPF_6$", *Electrolyte Journal of The electrochemical Society*, 160 (5) A3113-A3125 (2013).

Solvents of the electrolyte, of carbonate type, have been replaced with new fluorinated solvents or sulfones which are more stable at high voltage, as described by Nan Shao & al., in Electrochemical Windows of Sulfone-Based Electrolytes for High-Voltage Li-Ion Batteries, *J. Phys. Chem.* B 2011, 115, 12120-12125.

Finally, additives have been added to the electrode and react in order to protect the cathode from the electrolyte, as described in document CN 102694178.

It should be noted that all these approaches involve a modification of the internal chemistry and/or a modification of the design of the cells.

Another route has been explored, which consists of a specific process for formation of a Li-ion battery cell, as described in document WO 2010/30894. Firstly, the cell is charged until it reaches a state of charge of less than 50%. Then, the cell is stored for a predetermined period of time. In one particular embodiment, the storage period is two days at 45° C., followed by a period of a few hours at room temperature. The cell is subsequently charged until it reaches a state of charge of between 90% and 100%, then stored for several days at 45° C. Such a forming process comprising storage for two days at 45° C. does not make it possible to solve the problem of degassing of LNMO-based systems at high voltage.

The object of the present invention is to provide a solution which makes it possible to solve all the problems mentioned above.

BRIEF SUMMARY

According to the invention, a process for forming a Li-ion battery cell comprising an LNMO-based cathode material, an anode material, a separator and an electrolyte, comprises the following successive steps:
  (a) charging the cell until it reaches a state of charge of 100%;
  (b) storing the cell in a state of charge of 100% in an open circuit for a period of time of at least 48 hours;
  (c) removing the gas generated during the charging and the storage.

The process according to the invention makes it possible to considerably reduce the drawbacks associated with degassing during the use of the Li-ion battery cell and with the self-discharge during storage. Once formed by said process, the Li-ion battery cell provides, during its use, good electrochemical performance levels, in particular in terms of capacity.

Advantageously, the storage is carried out at room temperature.

According to one particular embodiment, the process according to the invention also comprises a step of discharging the cell until it reaches a state of charge of between 10% and 0%, followed by a step of storing the cell in a state of charge of between 10% and 0% in an open circuit at room temperature.

According to another feature of the invention, the successive steps of the process according to the invention are repeated at least a second time.

According to one particular embodiment, the storage time is at least equal to one week, preferentially at least equal to two weeks, more preferentially at least equal to four weeks.

Preferably, the volume of gas generated during storage is measured.

In another embodiment, the successive steps of the process according to the invention are repeated until the volume of gas generated is below a threshold.

Advantageously, when the volume of gas generated is below a threshold, a step of removing the gas is carried out, followed by a step of charging the cell until it reaches a state of charge of 100%, before use. An optional step of discharging until it reaches a state of charge of between 20% and 50% can subsequently be applied for the storage or transportation of the batteries.

Preferably, a preliminary step of activating the cell by injecting an electrolyte is carried out, followed by a step of impregnating said electrolyte in an open circuit for 48 hours at room temperature.

According to one variant of the process according to the invention, the storage step is carried out at a temperature of between 15 and 45° C. for a period of time of less than or equal to two weeks.

According to another feature of the invention, the process according to the invention for forming a Li-ion battery cell comprising an LNMO-based cathode material, an anode material, a separator and an electrolyte is such that said LNMO-based cathode material comprises an active material of formula $LiNi_xMn_{2-x}O_4$, in which $0<x\leq0.5$.

Other objectives, features and advantages of the present invention will become even more clearly apparent on reading the following description, given solely by way of non-limiting example, and given with reference to the attached drawings in which:

DETAILED DESCRIPTION

In the description of the invention, the term "based" is synonymous with "predominantly comprising".

It is, moreover, specified that the expressions "between . . . and . . . " and "from . . . to . . . " used in the present description should be understood to include each of the limits mentioned.

Figure 1:
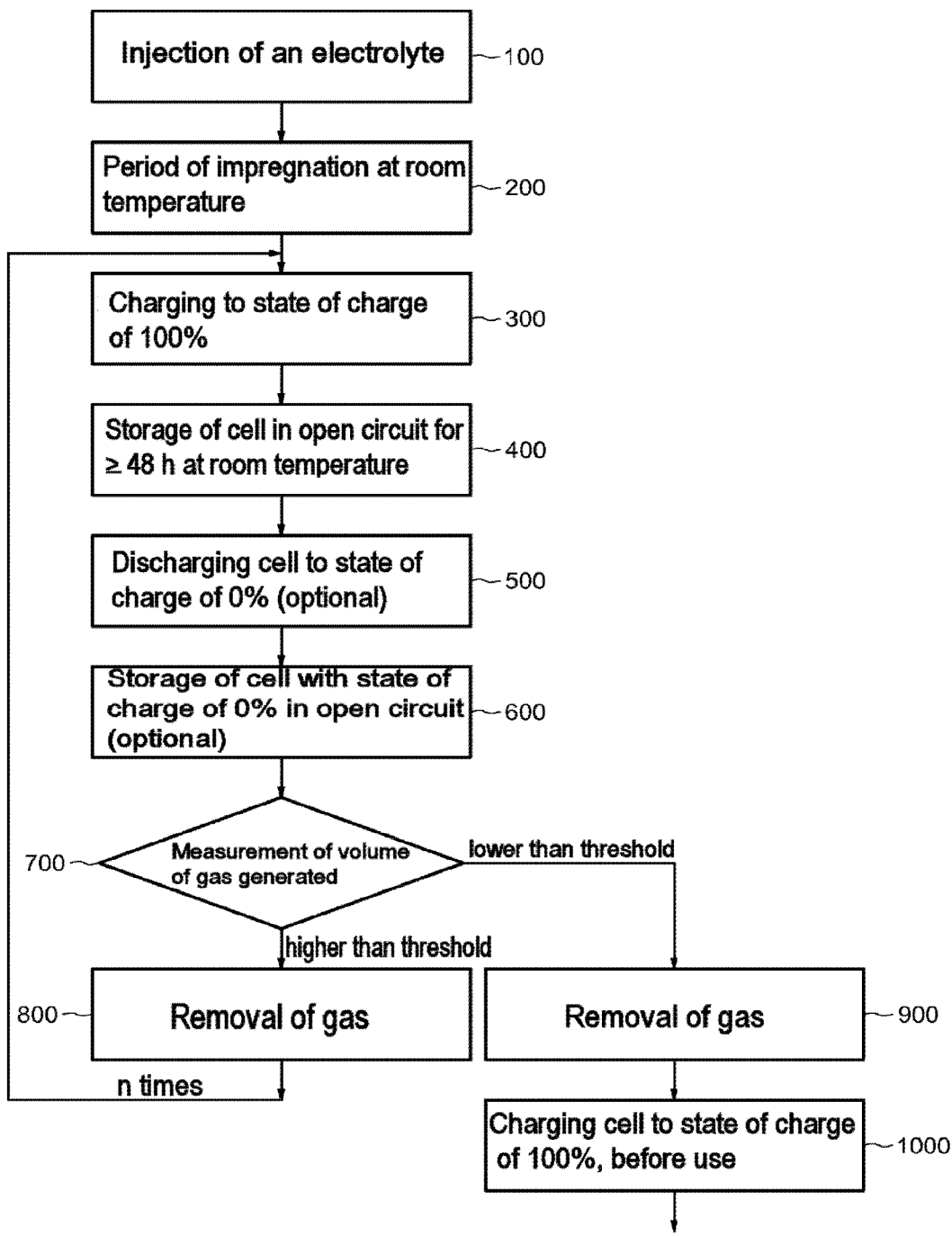
FIG. 1 is a diagram illustrating the various steps of the forming process according to the invention in one preferred embodiment.

FIG. 1 illustrates one particular embodiment of the forming process according to the invention.

As shown in FIG. 1, the cell is first of all activated by injection (100) of an electrolyte. A period of impregnation (200) in an open circuit at room temperature within the cell follows on for, for example, 48 hours. After having been charged (300) until it reaches a state of charge of 100%, the cell is then stored (400) in an open circuit for a period of at least 48 hours, for example for four weeks, at room temperature. During its storage, it generates gas and self-discharges due to parasitic reactions related to the instability of the electrolyte on contact with the electrode. With the accumulation of gas in the cell, the contact between the two electrodes is worsened. Optionally, a complete discharging (500) of the cell can then be carried out, followed by storage (600) in an open circuit at room temperature for, for example, 48 hours. The volume of gas generated during the storage (400) is then measured (700). If the volume is above a threshold, for example above 0.5 ml/g of LNMO-based material, the gas is removed (800) in order to ensure uniform contact between the two electrodes. The cell is then charged (300) once again until it reaches a state of charge of 100%, before being stored (400) once again in an open circuit at room temperature for, for example, four weeks.

The process can be repeated in this way as long as the volume of gas generated is above the threshold.

On the other hand, if, during the measuring step (700), the volume of gas generated is below the threshold, a final removal (900) of gas followed by charging (1000) of the cell until it reaches a state of charge of 100% are carried out. The cell is then formed and ready to be used. If it must be stored or transported, a discharge can then be applied until it reaches a state of charge of between 20% and 50%.

In fact, the process consists here in storing the cell in an open circuit in the charge state until the gas-generating process has slowed to acceptable speeds for the intended application. This gas-generating process speed depends essentially on the packaging of a cell. Thus, if the volume of gas generated is below the threshold, the speed of this process is judged to be sufficiently low to allow the use of a cell in cycling.

The process according to the invention for forming a Li-ion battery cell comprising an LNMO-based cathode material, an anode material, a separator and an electrolyte is such that said LNMO-based cathode material comprises an active material of formula $LiNi_xMn_{2-x}O_4$, in which $0<x\leq0.5$.

In addition to the active material, the LNMO-based cathode material may also comprise carbon fibers. For example, these are vapor grown carbon fibers (VGCFs) sold by the company Showa Denko. Other types of appropriate carbon fibers may be carbon nanotubes, doped nanotubes (optionally doped with graphite), carbon nanofibers, doped nanofibers (optionally doped with graphite), single-walled carbon nanotubes or multi-walled carbon nanotubes. The methods of synthesis relating to these materials can include arc discharge, laser ablation, a plasma torch and chemical vapor decomposition.

The LNMO-based cathode material may also comprise one or more binder(s).

For example, the binder(s) can be chosen from polybutadiene/styrene latexes and organic polymers, and preferably from polybutadiene/styrene latexes, polyesters, polyethers, polymer derivatives of methyl methacrylate, polymer derivatives of acrylonitrile, carboxymethylcellulose and its derivatives, polyvinyl acetates or polyacrylate acetate, polyvinylidene fluorides, and mixtures thereof.

The process according to the invention for forming a Li-ion battery cell comprising an LNMO-based cathode material, an anode material, a separator and an electrolyte is such that said cell comprises a graphite-based or LTO-based anode material.

The graphite carbon can be chosen from synthetic graphite carbons and natural graphite carbons, starting from natural precursors, followed by purification and/or a post-treatment. Other carbon-based active materials can be used, such as pyrolytic carbon, amorphous carbon, active carbon, coke, coal pitch and graphene. Mixtures of graphite with one or more of these materials are possible.

The LTO-based anode material comprises, for example, an active material of formula $Li_4Ti_5O_{12}$ (LTO).

The graphite-based or LTO-based anode material can also comprise one or more binders as for the cathode.

The binders described above for the cathode can be used for the anode.

A separator is preferably placed between the electrodes of the Li-ion battery cell. It acts as an electrical insulator. Several materials can be used as separators. The separators are generally composed of porous polymers, preferably of polyethylene and/or polypropylene.

The process according to the invention for forming a Li-ion battery cell comprising an LNMO-based cathode material, an anode material, a separator and an electrolyte is such that said battery comprises an electrolyte, which is preferably liquid.

The most common lithium salt is an inorganic salt, namely lithium hexafluorophosphate ($LiPF_6$). Other inorganic salts are appropriate and can be chosen from $LiClO_4$, $LiAsF_6$, $LiBF_4$ or LiI. Organic salts are also appropriate and can be chosen from lithium bis[(trifluoromethyl)sulfonyl] imide ($LiN(CF_3SO_2)_2$), lithium trifluoromethanesulfonate ($LiCF_3SO_3$), lithium bis(oxalato)borate (LiBOB), lithium fluoro(oxolato)borate (LiFOB), lithium difluoro(oxolato) borate (LiDFOB), lithium bis(perfluoroethylsulfonyl)imide ($LiN(CF_3CF_2SO_2)_2$), $LiCH_3SO_3$, $LiR_FSOSR_F$, $LiN(R_FSO_2)_2$ and $LiC(R_FSO_2)_3$, $R_F$ being a group chosen from a fluorine atom and a perfluoroalkyl group comprising between one and eight carbon atoms.

The lithium salt(s) is (are) preferably dissolved in one or more solvents chosen from aprotic polar solvents, for example ethylene carbonate (denoted "EC"), propylene carbonate, dimethyl carbonate (denoted "DMC") and ethyl methyl carbonate (denoted "EMC").

EXAMPLE

1. Process for Forming a Li-ion Battery Cell

The cell is first of all activated by injection (100) of an electrolyte. A period of impregnation (200) at room temperature (23° C.) within the cell follows on for 48 hours. After having been charged (300) until it reaches a state of charge of 100%, the cell is stored (400) in an open circuit at room temperature for four weeks.

Complete discharge (500) of the cell is then carried out, followed by storage (600) in an open circuit at room temperature for 12 hours. The volume of gas generated is measured (700) at the end of this first period of four weeks of storage, called first storage. Since it is too high (1.4 ml according to curve A in FIG. 2), removal (800) of the gas is carried out. The cell is charged (300) once again until it reaches a state of charge of 100%, before being stored (400) once again in an open circuit at room temperature for four weeks. This is the second period of four weeks of storage, called second storage.

The cell is completely discharged (500) and then stored (600) in an open circuit at room temperature for 12 hours. The volume of gas generated is again measured (700). The cell degases further, but to a lesser extent than during the first storage (0.6 ml according to curve B in FIG. 2). This observation is a sign of gradual stabilization of the cathode/ electrolyte interface.

Since the volume of gas generated is still too high, a further removal (800) of the gas is carried out and the formation process is relaunched. At the end of the third period of storage, called third storage, followed by complete discharge (500) and storage (600) in an open circuit at room temperature for 12 hours, the volume of gas generated is measured (700) (0.2 ml according to curve C in FIG. 2). Since it is judged to be sufficiently low, final removal (900) of the gas is carried out, followed by charging (1000) of the cell until it reaches a state of charge of 100%. The cell is then formed and ready to be employed for use.

2. Cell Evaluation and Result 2.1 Result Regarding Degassing

Figure 2:
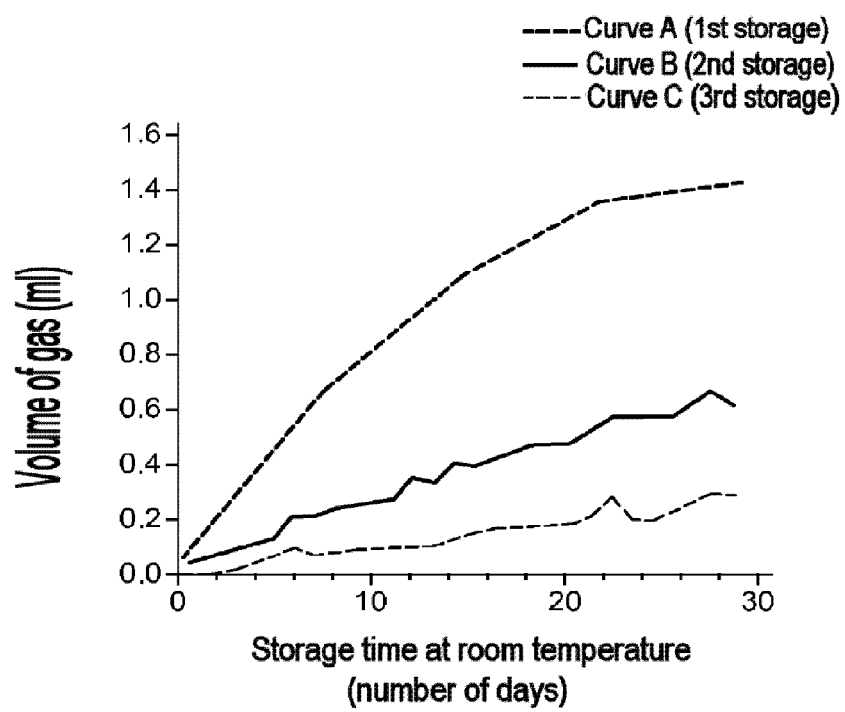
FIG. 2 is a graph showing the evolution of the volume of gas generated during periods of four weeks of storage in a state of charge of 100% and repeated three times.

FIG. 2 shows, as mentioned above, that the Li-ion battery cell degasses to an increasingly lesser extent with the number of repetitions of the forming process according to the invention. Thus, after a first storage (400) in a state of charge of 100% for four weeks at room temperature, curve A indicates that the cell generates 1.4 ml of gas.

Since this volume of gas is too high, the forming process according to the invention is relaunched.

After the second storage of four weeks, curve B indicates that the cell generates 0.6 ml of gas. Since this volume of gas is again judged to be too high, the various steps of the forming process according to the invention are repeated.

After the third storage of four weeks, curve C indicates that the cell generates only 0.2 ml.

The cell is consequently formed and ready to be used.

2.2 Result Regarding Self-Discharge

Figure 3:
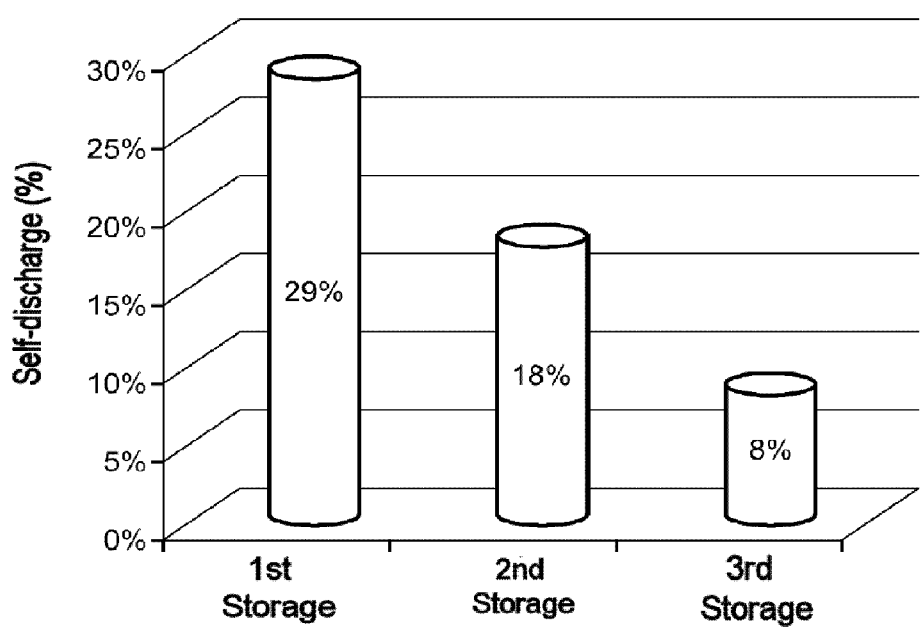
FIG. 3 is a histogram representing the evolution of the self-discharge after periods of four weeks of storage in a state of charge of 100%.

FIG. 3 shows that the self-discharge is increasingly weak with the number of repetitions of the forming process according to the invention. Thus, after a first storage (400), the self-discharge of the Li-ion battery cell is evaluated at 29%.

The forming process according to the invention is repeated and the cell is again stored for four weeks at room temperature. After this second storage, the self-discharge is evaluated at 18%.

The forming process according to the invention is again repeated and, after the third storage, the self-discharge is evaluated at only 8%.

All of the results that FIGS. 2 and 3 disclose suggest that the cathode/electrolyte interface is increasingly stable.

The initial objective of developing a process for specifically forming a Li-ion battery cell comprising an LNMO-based cathode material making it possible to considerably reduce the degassing and the self-discharge is thus achieved.

The invention claimed is:

1. A process for forming a Li-ion battery cell comprising an LNMO-based cathode material comprising an active material of formula $LiNi_xMn_{2-x}O_4$ in which $0<x\leq0.5$, an anode material, a separator and an electrolyte, the process comprising the following successive steps:

charging a Li-ion battery cell having a charge of less than 100% until the Li-ion battery cell reaches a state of charge of 100%;

storing the Li-ion battery cell in the state of charge of 100% in an open circuit for a period of time of at least 48 hours; and removing gas generated during the charging and the storing, wherein, when a volume of the gas generated is below a threshold, the removing of the gas is followed by charging the Li-ion battery cell until the Li-ion battery cell reaches the state of charge of 100%, and then the Li-ion battery cell is discharged until it reaches a state of charge of between 20% and 50%.

2. The process as claimed in claim 1, wherein the storing is carried out at room temperature.

3. The process as claimed in claim 1, further comprising:

discharging the Li-ion battery cell until the Li-ion battery cell reaches a state of charge of between 10% and 0%; and storing, after the discharging, the Li-ion battery cell in the state of charge of between 10% and 0% in an open circuit at room temperature.

4. The process as claimed in claim 1, wherein the charging, the storing, and the removing are repeated at least a second time.

5. The process as claimed in claim 1, wherein the period of time for the storing is at least equal to one week.

6. The process as claimed in claim 1, wherein the period of time for the storing is at least equal to two weeks.

7. The process as claimed in claim 1, wherein the period of time for the storing is at least equal to four weeks.

8. The process as claimed in claim 1, further comprising:

measuring a volume of the gas generated during the storing.

9. The process as claimed in claim 1, further comprising, prior to the charging:

activating the Li-ion battery cell by injecting the electrolyte into the Li-ion battery cell; and impregnating the electrolyte in an open circuit for 48 hours at room temperature.

10. The process as claimed in claim 1, wherein:

the storing is carried out at a temperature of between 15 and 45° C.; and the period of time for the storing is less than or equal to two weeks.

\* \* \* \* \*

UNITED STATES PATENT AND TRADEMARK OFFICE
CERTIFICATE OF CORRECTION

PATENT NO. : 10,749,219 B2
APPLICATION NO. : 15/303977
DATED : August 18, 2020
INVENTOR(S) : Viet-Phong Phan et al.

It is certified that error appears in the above-identified patent and that said Letters Patent is hereby corrected as shown below:

In the Specification

In Column 5, Line 38, "oxolato" should read -- oxalato --.

In Column 5, Line 38, "oxolato" should read -- oxalato --.

Signed and Sealed this
Twelfth Day of January, 2021

Andrei Iancu
*Director of the United States Patent and Trademark Office*